(12) United States Patent
Vögtle et al.

(10) Patent No.: US 12,117,070 B2
(45) Date of Patent: Oct. 15, 2024

(54) TORQUE-TRANSMITTING DEVICE AND DRIVETRAIN

(71) Applicant: Schaeffler Technologies AG & Co. KG, Herzogenaurach (DE)

(72) Inventors: Benjamin Vögtle, Weingarten (DE); Thorsten Krause, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 388 days.

(21) Appl. No.: 17/771,025

(22) PCT Filed: Aug. 20, 2020

(86) PCT No.: PCT/DE2020/100731
§ 371 (c)(1),
(2) Date: Apr. 22, 2022

(87) PCT Pub. No.: WO2021/078321
PCT Pub. Date: Apr. 29, 2021

(65) Prior Publication Data
US 2022/0397186 A1 Dec. 15, 2022

(30) Foreign Application Priority Data

Oct. 23, 2019 (DE) .................... 10 2019 128 610.7

(51) Int. Cl.
*F16H 45/02* (2006.01)
*B60K 6/387* (2007.10)
*F16H 45/00* (2006.01)

(52) U.S. Cl.
CPC ............. *F16H 45/02* (2013.01); *B60K 6/387* (2013.01); *B60Y 2200/92* (2013.01);
(Continued)

(58) Field of Classification Search
CPC ........................... F16H 45/02; B60Y 2200/92
See application file for complete search history.

(56) References Cited

U.S. PATENT DOCUMENTS 9,285,024 B2 * 3/2016 Kombowski ........... F16H 45/02
10,663,050 B2 * 5/2020 Maienschein ......... F16F 15/145
(Continued)

FOREIGN PATENT DOCUMENTS

DE         10219080 A1   11/2003
DE    102008026426 A1   12/2008
(Continued)

*Primary Examiner* — Brian L Swenson

(57) ABSTRACT

A torque-transmitting device has a first input side, a second input side, an output side, a hydrodynamic converter, a lockup clutch, a first torque-transmitting path which runs between a splitting point and a merging point, and a second torque-transmitting path which is configured so as to be parallel with respect to the first torque-transmitting path. The hydrodynamic converter is arranged in the first torque-transmitting path and the lockup clutch is arranged in the second torque-transmitting path. The hydrodynamic converter has a pump wheel and a turbine wheel which is hydrodynamically connectable to the pump wheel. The splitting point is connected to the first input side for conjoint rotation. The pump wheel and a first clutch input side of the lock-up clutch are each connected to the splitting point for conjoint rotation. A second input side is connected downstream of the merging point in a torque flow of a first torque from the first input side to the output side.

20 Claims, 3 Drawing Sheets

(52) U.S. Cl.
CPC .......... *F16H 2045/005* (2013.01); *F16H 2045/0221* (2013.01); *F16H 2045/0226* (2013.01); *F16H 2045/0263* (2013.01)

(56) References Cited

U.S. PATENT DOCUMENTS

| | | | |
|---|---|---|---|
| 2010/0242466 A1* | 9/2010 | Krause | F16F 15/167 60/338 |
| 2011/0192692 A1* | 8/2011 | Werner | F16F 15/145 192/3.29 |
| 2013/0068580 A1* | 3/2013 | Doegel | F16H 47/08 192/3.28 |
| 2016/0348779 A1* | 12/2016 | Voegtle | F16F 15/145 |
| 2017/0328455 A1* | 11/2017 | Li | F16D 21/00 |
| 2021/0025490 A1* | 1/2021 | Li | F16D 7/048 |

FOREIGN PATENT DOCUMENTS

| | | |
|---|---|---|
| DE | 102011109702 A1 | 2/2013 |
| DE | 102015208822 A1 | 12/2015 |
| WO | 2018228634 A1 | 12/2018 |

\* cited by examiner

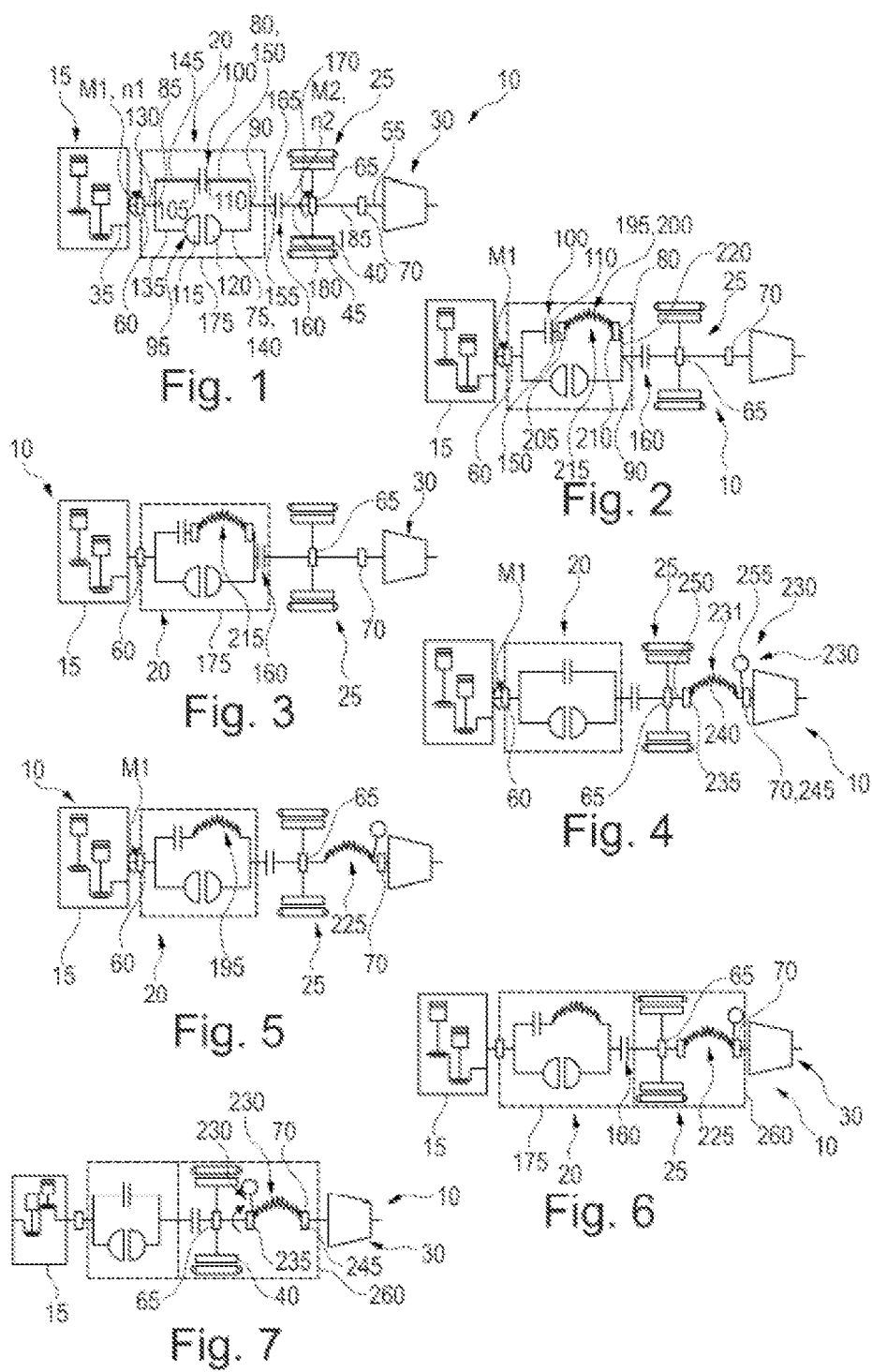

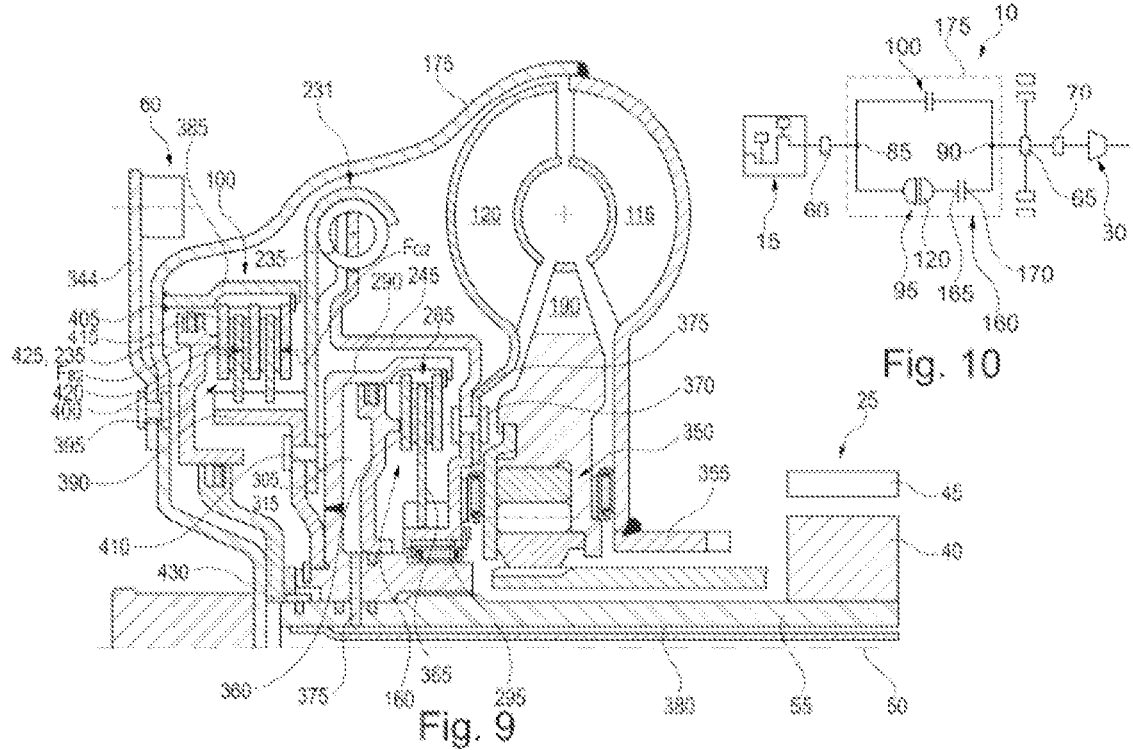

TORQUE-TRANSMITTING DEVICE AND DRIVETRAIN

CROSS-REFERENCE TO RELATED APPLICATIONS

This application is the U.S. National Phase of PCT Appln. No. PCT/DE2020/100731 filed Aug. 20, 2020, which claims priority to DE 102019128610.7 filed Oct. 23, 2019, the entire disclosures of which are incorporated by reference herein.

TECHNICAL FIELD

The disclosure relates to a torque-transmitting device.

BACKGROUND

In order to eliminate rotational irregularities in a drivetrain, a torsional vibration damper, for example, a dual mass flywheel or a torsional damper, is usually interposed between a crankshaft output side and a clutch input side of a clutch. This design requires a considerable amount of installation space in the axial direction, which is often only available to a limited extent, particularly in the case of smaller motor vehicles.

SUMMARY

It is desirable to provide an improved torque-transmitting device, and an improved drivetrain for a motor vehicle, in particular for a hybrid vehicle.

An improved torque-transmitting device for a drivetrain of a motor vehicle can be provided in that the torque-transmitting device has a first input side, a second input side, an output side, a hydrodynamic converter, a lock-up clutch, and a first torque-transmitting path which runs between a splitting point and a merging point, and a second torque-transmitting path, which is configured so as to be parallel to the first torque-transmitting path. The hydrodynamic converter is arranged in the first torque-transmitting path and the lock-up clutch is arranged in the second torque-transmitting path. The first input side is connectable to a crankshaft of an internal combustion engine for conjoint rotation and a first torque can be introduced into the first input side via the first input side. The second input side is connectable to an electric machine in a torque-locking manner. The output side is connectable to a transmission device. The hydrodynamic converter has a pump wheel and a turbine wheel, which is hydrodynamically connectable to the pump wheel. The splitting point is connected to the first input side for conjoint rotation. The pump wheel and a first clutch input side of the lock-up clutch are each connected to the splitting point for conjoint rotation. The second input side is connected downstream of the merging point in a torque flow of a first torque from the first input side to the output side.

An advantage according to one example embodiment of the disclosure is that the torque-transmitting device is designed to be particularly compact in the axial direction. Furthermore, in converter operation, i.e., with the lock-up clutch open, rotational irregularities in the first torque can be at least partially canceled out, so that the first torque at the output side is smoother and more uniform than at the first input side. By arranging the second input side in the torque flow between the merging point and the output side, the drivetrain, including the internal combustion engine and the electric machine, can be designed to be particularly compact. In particular, the electric machine is spatially separated from the internal combustion engine so that good cooling can be provided for the electric machine and overheating of the electric machine can be avoided.

In a further embodiment, the input side is designed to be rigid. Additionally or alternatively, the first input side is connected to the splitting point for conjoint rotation. This embodiment provides the advantage that, due to the rigid input side, the first torque is rigidly transmitted directly from the crankshaft to the splitting point by means of a rigid first torque transmission and from the splitting point to the pump wheel or to the first clutch input side of the lock-up clutch, respectively, without any (significant) cancellation of rotational irregularities in the first torque. The first torque transmission can be designed as a shaft or in a disc shape, for example, so that the required installation space is particularly small. For example, the first input side can be a flex plate.

In a further embodiment, the torque-transmitting device has a separating clutch. The separating clutch is arranged between the second input side and the turbine wheel of the hydrodynamic converter and is designed to connect the turbine wheel to the second input side in a torque-locking manner in a closed state. In a first open state, the separating clutch is designed to decouple the second input side from the turbine wheel. This embodiment provides the advantage that during purely electric operation of the drivetrain, i.e., when the combustion chamber is deactivated, for example, and only the electric machine is activated and provides a second torque, the second torque is not reduced by a drag torque in the hydrodynamic converter, but is essentially transmitted from the second input side to the output side. The separating clutch is in the closed state when the internal combustion engine is driving the first torque to drive the output side and/or to drive the electric machine when it is switched to generator operation. The rotational irregularities in the first torque occur mainly at low speed. As the speed increases, the rotational irregularities decrease in intensity. The fact that the lock-up clutch is open at low speeds below a predefined speed and the torque-transmitting device is operated in converter operation means that the rotational irregularities from the first input side are only transmitted to the separating clutch via the converter in a greatly reduced manner, so that the separating clutch can be designed to be particularly small overall since it does not have to transmit the first torque with high rotational irregularities. Above the predefined speed, the hydrodynamic converter is bypassed by closing the lock-up clutch. Above the predefined speed, the rotational irregularities are much less intense than at low speed, so that the separating clutch is not overloaded even when the lock-up clutch is closed.

In a further embodiment, the separating clutch is arranged between the second input side and the merging point. Thus, the separating clutch is arranged downstream of the merging point in the torque flow of the first torque and upstream of the second input side. Alternatively, the separating clutch can be arranged between the turbine wheel and the merging point.

In a further embodiment, the torque-transmitting device has a first absorber device, wherein the first absorber device is arranged between the lock-up clutch and the second input side, preferably between the lock-up clutch and the merging point or the separating clutch. The first absorber device is designed to at least partially cancel out a rotational irregularity of the first torque. The first absorber device has at least one first torsional damper, for example, a dual mass flywheel, a series damper and/or simple torsional damper and/or a centrifugal pendulum. This embodiment provides the advantage that even when the lock-up clutch is closed and the separating clutch is closed, i.e., when the hydrodynamic converter is bypassed, rotational irregularities (above the predefined speed) in the first torque can be canceled out during torque transmission of the first torque from the first input side to the output side.

In a further embodiment, the torque-transmitting device has a housing defining a housing interior and a flex plate, wherein the first torque-transmitting path and the second torque-transmitting path are formed in the housing interior at least in sections. The flex plate is connected to the housing for conjoint rotation and forms the first input side. The housing rigidly connects the pump wheel to the flex plate for conjoint rotation. The separating clutch is formed in the housing interior or outside the housing. The second input side is arranged outside the housing. This embodiment provides the advantage that a volume of the housing interior can be kept particularly low, so that the volume of the converter fluid is also particularly low. As a result, the torque-transmitting device is designed to be particularly light overall.

In a further embodiment, the torque-transmitting device has a second absorber device. The second absorber device is arranged between the second input side and the output side and is designed to at least partially cancel out a rotational irregularity of the first torque. The second absorber device has at least one second torsional damper, for example, a dual mass flywheel, a series damper and/or simple torsional damper and/or a further centrifugal pendulum. The downstream arrangement of the second absorber device in the torque flow provides the advantage that the second absorber device can be arranged in a dry space or outside the housing interior.

In a further embodiment, the second torsional damper has a second input part, a second output part and at least one second energy storage element, wherein the second input part is rotatable relative to the second output part against the action of the second energy storage element, wherein the second input part is connected to the second input side for conjoint rotation and the second output part is connected to the output side for conjoint rotation, preferably in a rigid manner. The further centrifugal pendulum is arranged at the second output part or the second input part.

An advantageous drivetrain for a motor vehicle can be provided in that the drivetrain has the torque-transmitting device described above, an internal combustion engine, and an electric machine, wherein the internal combustion engine has a crankshaft. The crankshaft is connected to the first input side for conjoint rotation. The internal combustion engine is designed to provide the first torque at the first input side. The electric machine is connected to the second input side on the output side for conjoint rotation and is designed to provide a second torque at the second input side. The second input side is designed to superimpose the first torque with the second torque. This embodiment provides the advantage that a particularly good and cost-effective hybrid drivetrain can be provided for a motor vehicle. In particular, this drivetrain has a particularly short and compact design in both the radial and axial directions.

In a further embodiment, in an operating state of the drivetrain, the internal combustion engine is configured to drive the first input side at a first speed, and the electric machine is configured to drive the second input side at a second speed. In the operating state, the lock-up clutch is open. If the speed falls below a predefined differential speed due to a speed difference between the first speed and the second speed, the separating clutch is switched to the open state and the second input side is decoupled from the turbine wheel. This embodiments provides the advantage that, in particular when the internal combustion engine is deactivated or, for example, is only operated at idle speed in order to drive auxiliary units, for example, a drag torque in the hydrodynamic converter is avoided and the second torque provided by the electric machine can be used to drive the output side without the second torque being significantly reduced by the drag torque.

BRIEF DESCRIPTION OF THE DRAWINGS

The disclosure is explained in more detail below with reference to figures. In the figures:

FIG. 1 shows a schematic functional diagram of a drivetrain according to a first embodiment of a motor vehicle;

FIG. 2 shows a functional diagram of a drivetrain according to a second embodiment;

FIG. 3 shows a functional diagram of a drivetrain according to a third embodiment;

FIG. 4 shows a functional diagram of a drivetrain according to a fourth embodiment;

FIG. 5 shows a functional diagram of a drivetrain according to a fifth embodiment;

FIG. 6 shows a functional diagram of a drivetrain according to a sixth embodiment;

FIG. 7 shows a functional diagram of a drivetrain according to a seventh embodiment;

FIG. 9 shows a half-longitudinal section through a constructive configuration of the drivetrain shown in FIG. 3; and FIG. 10 shows a functional diagram of a drivetrain according to an eighth embodiment.

DETAILED DESCRIPTION

Figure 8:
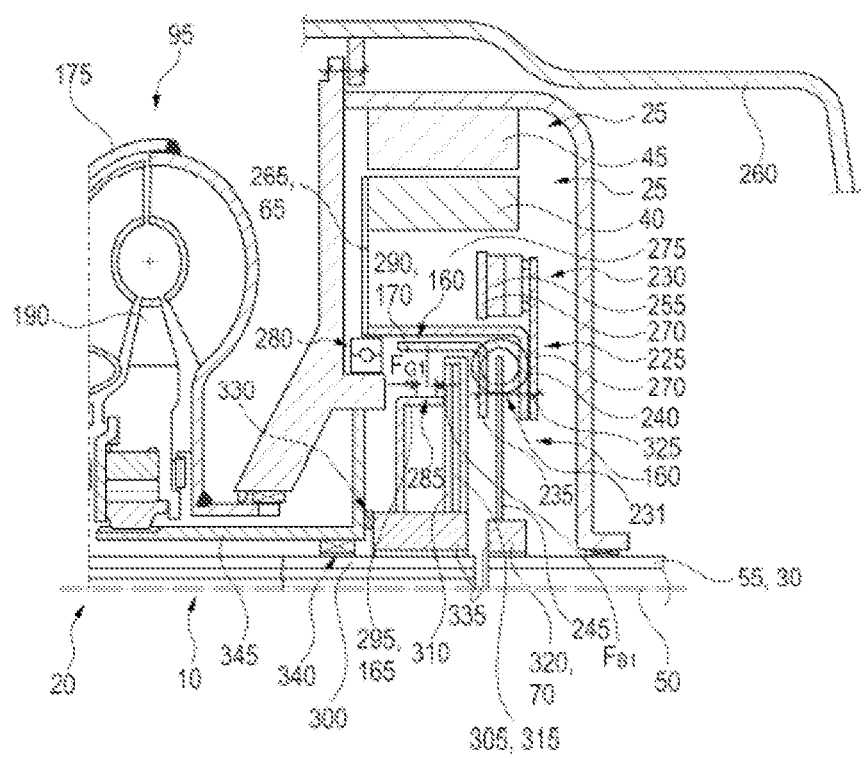
FIG. 8 shows a detail of a half-longitudinal section through the drivetrain shown in FIG. 7.

FIG. 1 shows a schematic functional diagram of a drivetrain 10 according to a first embodiment of a motor vehicle.

In this example, the drivetrain 10 has an internal combustion engine 15, a torque-transmitting device 20, an electric machine 25, and a transmission device 30.

The internal combustion engine 15 can be designed as a reciprocating piston engine. The internal combustion engine 15 has a crankshaft 35. In the activated state, the internal combustion engine 15 provides a first torque M1 at the crankshaft 35. The crankshaft 35 has a first speed n1 in operation.

The electric machine 25 can be designed as a brushless DC motor, for example. The electric machine 25 has a rotor 40 and a stator 45, wherein the rotor 40 is rotatably mounted about a rotation axis 50 (the rotation axis 50 is not shown in FIG. 1). The stator 45 is arranged in the motor vehicle for conjoint rotation. In this regard, the electric machine 25 can, for example, be designed as an internal rotor. In operation of the electric machine 25, the electric machine 25 provides a second torque M2 at a second speed n2.

The transmission device 30 can be designed, for example, as a continuously variable transmission or as an automatic transmission. The transmission device 30 has a transmission input shaft 55.

The torque-transmitting device 20 is arranged between the internal combustion engine 15 and the electric machine 25. In FIG. 1, rotating masses about the rotation axis 50 are shown symbolically by means of rectangles. A rigid torque transmission is shown by straight lines. The torque-transmitting device 20 has a first input side 60, a second input side 65, and an output side 70. The output side 70 is connected to the transmission device 30 for conjoint rotation by means of the transmission input shaft 55.

The first input side 60 is connected to the crankshaft 35 for conjoint rotation. The second input side 65 is connected to the rotor 40.

The torque-transmitting device 20 further has a first torque-transmitting path 75 and a second torque-transmitting path 80, wherein the first torque-transmitting path 75 and the second torque-transmitting path 80 run between a splitting point 85 and a merging point 90.

In the first torque-transmitting path 75, the torque-transmitting device 20 has a hydrodynamic converter 95, and in the second torque-transmitting path 80, the torque-transmitting device 20 has a lock-up clutch 100. The lock-up clutch 100 has a first clutch input side 105 and a first clutch output side 110, wherein the lock-up clutch 100 is designed to be switchable. In a first open state, a torque transmission between the first clutch input side 105 and the first clutch output side 110 is essentially interrupted. In a first closed state of the lock-up clutch 100, the first clutch input side 105 is connected to the first clutch output side 110 for conjoint rotation. The hydrodynamic converter 95 further has a pump wheel 115 and a turbine wheel 120, wherein the pump wheel 115 can be connected to the turbine wheel 120 in a torque-locking manner by means of a converter fluid.

The first input side 60 is connected to the splitting point 85 via a first torque transmission 130. When the internal combustion engine 15 is activated and provides the first torque M1, the splitting point 85 of the first input side 60 is connected downstream of the first input side 60 when transmitting the first torque M1 from the first input side 60 to the output side 70.

Between the splitting point 85 and the merging point 90, the first torque-transmitting path 75 and the second torque-transmitting path 80 run in parallel. Here, by means of a second torque transmission 135, the pump wheel 115 is connected to the splitting point 85 for conjoint rotation. A third torque transmission 140 connects the turbine wheel 120 to the merging point 90 for conjoint rotation. The first clutch input side 105 is connected to the splitting point 85 by means of a fourth torque transmission 145 for conjoint rotation and the first clutch output side 110 is connected to the merging point 90 by means of a fifth torque transmission 150 for conjoint rotation.

The torque-transmitting device 20 can have a separating clutch 160, wherein the separating clutch 160 is arranged between the merging point 90 and the second input side 65. The separating clutch 160 has a second clutch input side 165 and a second clutch output side 170.

The separating clutch 160 has a second closed state and a second open state, wherein in the second closed state the second clutch input side 165 is connected to the second clutch output side 170 in a torque-locking manner preferably for conjoint rotation. In the second open state, the second clutch input side 165 is essentially separated from the second clutch output side 170 such that torque transmission between the second clutch input side 165 and the second clutch output side 170 is inhibited.

The torque-transmitting device 20 can further have a housing 175. The housing 175 defines a housing interior 176. At least the first torque-transmitting path 75 and the second torque-transmitting path 80, as well as the lock-up clutch 100 arranged in the first and second torque-transmitting path 75 and 80, respectively, and the hydrodynamic converter 95 are arranged in the housing interior 176. The separating clutch 160 can be arranged outside the housing 175 between the second input side 65 and the housing 175.

The second clutch input side 165 is connected to the merging point 90 by means of the sixth torque transmission 155. A seventh torque transmission 180 connects the second clutch output side 170 to the second input side 65 for conjoint rotation. The second input side 65 can be connected to the output side 70 for conjoint rotation by means of an eighth torque transmission 185.

The torque-transmitting device 20 has a first operating state and at least a second operating state, wherein in the first operating state the lock-up clutch 100 is open and thus torque transmission between the first clutch input side 105 and the first clutch output side 110 is essentially interrupted. In the first operating state, the torque-transmitting device 20 is switched to a converter operation.

The drivetrain 10 for the motor vehicle can be operated in several different operating states. In a first operating state, the internal combustion engine 15 is activated. Here, the internal combustion engine 15 provides the first torque M1 at the first speed n1 by means of the crankshaft 35 on the first input side 60. The first torque M1 is transmitted from the first input side 60 to the splitting point 85 via the first torque transmission 130. In the first operating state, the lock-up clutch 100 is open, so that torque transmission between the first clutch input side 105 and the first clutch output side 110 is essentially interrupted. Through the opened lock-up clutch 100, the first torque M1 coming from the first input side 60 is transmitted via the first torque transmission 130 to the splitting point 85 and, due to the opened state of the lock-up clutch 100, via the second torque transmission 135 to the pump wheel 115. The pump wheel 115 drives the turbine wheel 120 with the converter fluid.

The hydrodynamic converter 95 can have a guide wheel 190, wherein the guide wheel 190 is not shown in FIG. 1 for reasons of clarity, but instead is shown in FIGS. 8-9. The guide wheel 190 is designed to guide the converter fluid between the pump wheel 115 and the turbine wheel 120. In this regard, the guide wheel 190 can cause an increase in torque of the first torque M1 at the turbine wheel 120. The increased first torque M1U applied to the turbine wheel 120 is transmitted to the merging point 90 via the third torque transmission 140. The merging point 90 transmits the increased first torque M1U to the second clutch input side 165 via the sixth torque transmission 155.

The separating clutch 160 is closed so that the second clutch input side 165 is connected to the second clutch output side 170 for conjoint rotation. The first increased torque M1U is transmitted to the second input side 65 via the closed separating clutch 160. In the first operating state of the drivetrain 10, the electric machine 25 is deactivated. The increased first torque M1U is transmitted to the second input side 65 via the separating clutch 160. The first increased torque M1U is transmitted from the first input side 60 to the output side 70 via the eighth torque transmission 185. At the output side 70, the first increased torque M1U is directed from the torque-transmitting device 20 toward the transmission device 30.

In a second operating state of the drivetrain 10, the lock-up clutch 100 is closed so that the first clutch input side 105 is connected to the first clutch output side 110 in a friction-locking manner. The lock-up clutch 100 bypasses the hydrodynamic converter 95. In the closed state of the lock-up clutch 100, the torque transmission of the first torque M1 from the first input side 60 towards the output side 70 is such that the first torque M1, coming from the first input side 60 is transmitted to the splitting point 85 via the first torque transmission 130. Via the closed lock-up clutch 100, the fourth torque transmission 145 and the fifth torque transmission 150 transmit the first torque M1 to the merging point 90. From the merging point 90, the first torque M1 is transmitted to the second clutch input side 165 via the sixth torque transmission 155. In the second closed state of the separating clutch 160, the second clutch input side 165 is connected to the second clutch output side 170 in a friction-locking manner. Via the separating clutch 160, in the second closed state, the first torque M1 is thus transmitted to the seventh torque transmission 180 and thus to the second input side 65. From the second input side 65, the first torque M1 is diverted to the output side 70 via the eighth torque transmission 185.

A third operating state of the drivetrain 10 is essentially identical to the first operating state of the drivetrain 10. Additionally, the electric machine 25 is activated and provides the second torque M2 at the second input side 65. The first torque M1 and the second torque M2 act in the same direction to drive the output side 70. Here, the second input side 65 acts as a summing element to superimpose the increased first torque M1U transmitted to the second input side 65 via the hydrodynamic converter 95 during converter operation with the second torque M2. The sum of the increased first torque M1U and the second torque M2 is transmitted via the eighth torque transmission 185 to the output side 70 for driving the transmission device 30.

A fourth operating state of the drivetrain 10 is essentially identical to the second operating state explained above. Additionally, the electric machine 25 can be operated as a generator or be activated. In generator operation, the electric machine 25 acts with the second torque M2 against the first torque M1, so that the first torque M1 transmitted via the torque-transmitting device 20 to the output side 70 is reduced at the output side 70 by the second torque M2.

Alternatively, the electric machine 25 can be activated so that the first torque M1 and the second torque M2 act in the same direction. Here, the second input side 65 acts as a summing element to transmit the sum of the first torque M1 and the second torque M2 from the second input side 65 to the output side 70 via the eighth torque transmission 185.

In a fifth operating state of the drivetrain 10, the internal combustion engine 15 is deactivated or rotates at the first speed n1, for example to drive auxiliary units. The electric machine 25 is activated and provides the second torque M2. The separating clutch 160 is open, so that a torque transmission between the second clutch input side 165 and the second clutch output side 170 is interrupted. This prevents the second torque M2 from being transmitted in the direction of the internal combustion engine 15 or the first input side 60. The second torque M2 is transmitted from the second input side 65 to the output side 70 via the eighth torque transmission 185. Thus, in the fifth operating state, the transmission device 30 is operated solely by the electric machine 25. By opening and providing the separating clutch 160 between the second input side 65 and the merging point 90, it is avoided that, when the internal combustion engine 15 is deactivated or rotates at a lower first speed n1 than the second speed n2 at which the second input side 65 rotates, the rotating turbine wheel 120 acts against the stationary pump wheel 115 by means of the converter fluid and thereby the second torque M2 for driving the output side 70 is reduced by a drag torque between the turbine wheel 120 and the pump wheel 115 occurring thereby in the hydrodynamic converter 95.

Furthermore, the downstream arrangement of the electric machine 25 in the torque flow of the first torque M1 from the first input side 60 to the output side 70 allows the electric machine 25 to be accommodated in a particularly space-saving manner.

Furthermore, the first embodiment shown in FIG. 1 allows the first input side 60 to be connected directly to the crankshaft 35 for conjoint rotation, so that the arrangement of a further absorber device, in particular a dual mass flywheel, between the first input side 60 and the crankshaft 35 can be dispensed with.

Through the fourth torque transmission 145 and the second torque transmission 135, both the pump wheel 115 and the first clutch input side 105 are connected to the splitting point 85 for conjoint rotation. Furthermore, the first torque transmission 130 connects the splitting point 85 to the first input side 60 for conjoint rotation. The first input side 60 is designed to be rigid in the circumferential direction.

For example, it is of particular advantage if the first input side 60 is designed as a flex plate 344 (see FIG. 9). The fact that the dual mass flywheel between the first input side 60 and the crankshaft 35 can be dispensed with means that the torque-transmitting device 20 is designed to be particularly compact.

Rotational irregularities generated by the internal combustion engine 15 are at least partially canceled out by the hydrodynamic converter 95 in converter operation of the torque-transmitting device 20 (corresponding to the first and third operating states) when the lock-up clutch 100 is open, so that the torque-transmitting device 20 is designed to be particularly favorable in terms of vibrations.

Furthermore, the separating clutch 160 can be designed to be particularly optimized in terms of space-saving due to the separating clutch 160 being arranged outside the housing 175. In particular, the separating clutch 160 can be designed as a dry-running clutch.

FIG. 2 shows a functional diagram of a drivetrain 10 according to a second embodiment.

The drivetrain 10 is designed essentially identically to the drivetrain 10 explained in FIG. 1. In the following, only the differences between the drivetrain 10 shown in FIG. 2 and the drivetrain 10 shown in FIG. 1 according to the first embodiment will be discussed.

In addition to the drivetrain 10 shown in FIG. 1, the drivetrain 10 shown in FIG. 2 has a first absorber device 195. In this embodiment, the first absorber device 195 comprises a first torsional damper 200 by way of example. The first torsional damper 200 has a first input part 205, a first output part 210, and at least one first energy storage element 215. The first energy storage element 215 can comprise, for example, a bow spring as symbolically shown in FIG. 2 by way of example. Alternatively or additionally, the first energy storage element 215 can have a compression spring or a combination of a bow and compression spring. In addition, the first energy storage element 215 can have a plurality of compression and/or bow springs. The first energy storage element 215 is arranged between the first input part 205 and the first output part 210. Here, the first input part 205 is rotatable about the rotation axis 50 relative to the first output part 210 against the action of the first energy storage element 215.

The first torsional damper 200 is arranged in the second torque-transmitting path 80. Here, the first torsional damper 200 is connected downstream in the torque flow of the first torque M1 from the first input side 60 to the output side 70 of the lock-up clutch 100. In this regard, the first input part 205 is connected to the first clutch output side 110 for conjoint rotation by means of the fifth torque transmission 150. The first output part 210 is connected to the merging point 90 for conjoint rotation by means of a ninth torque transmission 220.

In the second and fourth operating states, i.e., when the lock-up clutch 100 and the separating clutch 160 are closed and the internal combustion engine 15 is activated and provides the first torque M1, the first absorber device 195 cancels out rotational irregularities in the first torque M1, so that on the output side at the merging point 90 the first torque M1 is formed to be more uniform than on the first input side 60.

Due to the fact that the first absorber device 195, in particular the first torsional damper 200, is arranged in the second torque-transmitting path 80 it is ensured that in the fifth operating state with the separating clutch 160 open, the first torsional damper 200 is also decoupled from the second input side 65 and that the masses to be rotated by the electric machine 25 are particularly low. As a result, the energy requirement is particularly low, in particular during startup in the fifth operating state of the motor vehicle, since the energy required to rotate the masses is reduced.

FIG. 3 shows a functional diagram of a drivetrain 10 according to a third embodiment.

The drivetrain 10 is designed essentially identically to the drivetrain 10 explained in FIG. 2. In the following, only the differences between the drivetrain 10 shown in FIG. 3 and the drivetrain 10 shown in FIG. 2 according to the second embodiment will be discussed.

Deviating from FIG. 2, the separating clutch 160 is arranged in the housing 175 of the torque-transmitting device 20. This design provides the advantage that, in particular when the separating clutch 160 is designed as a wet-running clutch, only one housing 175 has to be fluidically sealed off from an environment, so that the design of the drivetrain 10 shown in FIG. 3 is particularly simple.

FIG. 4 shows a functional diagram of a drivetrain 10 according to a fourth embodiment.

The drivetrain 10 is essentially identical to the drivetrain 10 explained in FIG. 1. In the following, only the differences between the drivetrain 10 shown in FIG. 4 and the drivetrain 10 explained in FIG. 1 will be discussed.

Additionally to the drivetrain 10 shown in FIG. 1, the drivetrain 10 has a second absorber device 225. The second absorber device 225 has a second torsional damper 231 and a centrifugal pendulum 230. The second absorber device 225 is arranged between the second input side 65 and the output side 70. Thus, the second absorber device 225 is connected downstream of the electric machine 25 with respect to a torque flow of the first torque M1 from the first input side 60 toward the output side 70 of the second input side 65.

The second torsional damper 231 has a second input part 235, at least one second energy storage element 240, and a second output part 245. The second output part 245 can form the output side 70. The second input part 235 is arranged to be rotatable about the rotation axis 50 against the action of the second energy storage element 240 relative to the second output part 245. The second input part 235 can be connected to the second input side 65 for conjoint rotation by means of a tenth torque transmission 250.

The centrifugal pendulum 230 is arranged at the second output part 245, by way of example, and has at least one pendulum mass 255 designed to oscillate along a predefined pendulum path upon introduction of the rotational irregularity into the centrifugal pendulum 230 to cancel out the rotational irregularity in a manner adaptive to the rotational speed.

This embodiment provides the advantage that the first torque M1 provided at the output side 70 is particularly uniform.

FIG. 5 shows a functional diagram of a drivetrain 10 according to a fifth embodiment.

The drivetrain 10 is essentially a combination of the drivetrain 10 shown in FIG. 4 and the drivetrain 10 shown in FIG. 2. Here, the drivetrain 10 shown in FIG. 4 is additionally equipped with the first absorber device 195 in accordance with the fourth embodiment. This provides the advantage that rotational irregularities introduced into the torque-transmitting device 20 with the first torque M1 via the first input side 60 are canceled out on the way to the output side 70 by both the first absorber device 195 and the second absorber device 225, so that the first torque M1 provided at the output side 70 is formed to be particularly smooth in the second and fourth operating states. Furthermore, the first absorber device 195 and the second absorber device 225 can be tuned to different excitation frequencies to provide good absorber performance, for example, in an internal combustion engine 15 equipped with cylinder deactivation, in operation with and without cylinder deactivation.

FIG. 6 shows a functional diagram of a drivetrain 10 according to a sixth embodiment.

The drivetrain 10 is essentially a combination of the drivetrain 10 explained in FIG. 5 with the drivetrain 10 explained in FIG. 3. Compared to FIG. 5, the separating clutch 160 is arranged in the housing 175 of the torque-transmitting device 20. The second absorber device 225 is arranged outside the housing 175 of the torque-transmitting device 20. Here, for example, the second absorber device 225 can be arranged in a further housing 260, wherein the electric machine 25 in addition to the second input side 65 can be arranged in the further housing 260. This embodiment provides the advantage that the drivetrain 10 is designed to be modular.

FIG. 7 shows a functional diagram of a drivetrain 10 according to a seventh embodiment.

The drivetrain 10 is designed essentially identically to the drivetrain 10 explained in FIG. 4. In the following, only the differences between the drivetrain 10 explained in FIG. 7 and the drivetrain 10 explained in FIG. 4 will be discussed.

The centrifugal pendulum 230 is arranged at the second input part 235 instead of the second output part 245 (as shown in FIG. 4). Thus, the centrifugal pendulum 230 is connected to the rotor 40 and the second input side 65 for conjoint rotation.

FIG. 8 shows a detail of a half-longitudinal section through the drivetrain 10 shown in FIG. 7.

In addition to the housing 175, the torque-transmitting device 20 also comprises the further housing 260. The further housing 260 can also be part of the transmission device 30. The electric machine 25, the second absorber device 225 and the separating clutch 160 are arranged in the further housing 260, which is sealed in a fluid-tight manner with respect to the housing 175, for example. Here, in the further housing 260, the stator 45 is connected to the further housing 260 radially on the outside. The further housing 260 is stationary, whereas, on the other hand, the housing 175 of the torque-transmitting device 20 is rotatably mounted about the rotation axis 50. The rotor 40 is arranged radially on the inside of the stator 45.

The rotor 40 is connected to a pendulum flange 270 of the centrifugal pendulum 230 via a motor flange 265, which forms the second input side 65. The motor flange 265 is designed to be Z-shaped, for example. Radially on the inside of the rotor 40, the centrifugal pendulum 230, the separating clutch 160 and the second torsional damper 231 are arranged. Here, both the second absorber device 225 and the separating clutch 160 have a radial overlap with the rotor 40. In this context, radial overlap is understood to mean that when two components, for example the rotor 40 and the separating clutch 160 and/or the second absorber device 225, are projected in a radial direction, the two components at least partially overlap in a projection plane in which the rotation axis 50 runs. Due to the radially inner arrangement in radial overlap with the rotor 40, the torque-transmitting device 20 is designed to be particularly compact. Here, in the radial direction, the centrifugal pendulum 230 is arranged between the second torsional damper 231 and the rotor 40 in a first annular gap 275, which is defined by the second torsional damper 231 and the rotor 40.

In the embodiment, the centrifugal pendulum 230 is designed as an inboard centrifugal pendulum 230, by way of example, wherein the pendulum flange 270 is formed out of multiple parts. In the axial direction, the pendulum mass 255 is arranged between the two pendulum flanges 270. The pendulum mass 255 oscillates along the pendulum path (not shown in FIG. 8) with respect to the pendulum flange 270 upon introduction of rotational irregularities introduced into the torque-transmitting device 20 via the first input side 60.

The motor flange 265 is rotatably mounted in the further housing 260 via a first bearing arrangement 280. The separating clutch 160 is arranged radially on the inside of the motor flange 265. The separating clutch 160 is, by way of example, designed as a multiple disc clutch and has a first friction pack 285, a first outer disc carrier 290, and a first inner disc carrier 295. The first outer disc carrier 290 is connected integrally and in a materially uniform manner to the second input part 235 of the second torsional damper 231. In this regard, the first outer disc carrier 290 and the second input part 235 can be formed together in a pot-like manner.

The first inner disc carrier 295 is mounted on a shaft 300 for conjoint rotation. The shaft 300 is connected to the merging point 90 for conjoint rotation (not shown in FIG. 8). Here, the first inner disc carrier 295 forms the second clutch input side 165 and the first outer disc carrier 290 forms the second clutch output side 170. Furthermore, the first inner disc carrier 295 and the first outer disc carrier 290 define a second annular gap, wherein the first friction pack 285 is arranged in the second annular gap.

Furthermore, the separating clutch 160 has a first pressure chamber 305 and a first pressure piston 310, wherein the first pressure piston 310 is axially displaceably mounted and defines the first pressure chamber 305 in sections. The first pressure chamber 305 can be filled with a first pressure fluid 315. For example, the first pressure fluid 315 can be introduced into the first pressure chamber 305 under pressure coming from the transmission device 30 via the shaft 300. When the first pressure fluid 315 is provided, the first pressure piston 310 generates a first actuating force F$_{B1}$. The first actuating force F$_{B1}$ is guided by the first pressure piston 310 into the first friction pack 285. The first outer disc carrier 290 or the first inner disc carrier 295 can be used to provide support for the first friction pack 285 on the side axially opposite the first pressure piston 310, so that when the first actuating force F$_{B1}$ is provided, the first friction pack 285 is compressed by means of the first actuating force F$_{B1}$ and a first counterforce F$_{G1}$ and a first frictional connection is generated in the first friction pack 285, so that the first outer disc carrier 290 is thereby connected to the first inner disc carrier 295 in a torque-locking manner.

By means of a second bearing arrangement 330, a connecting hub 335 is supported on the further housing 260 in the axial direction. The connecting hub 335 is connected to the first inner disc carrier 295 for conjoint rotation, which is arranged radially on the outside of the connecting hub 335. Furthermore, the connecting hub 335 defines the first pressure chamber 305 in sections. The connecting hub 335 engages radially on the inside with the shaft 300 in order to connect the first inner disc carrier 295 to the first clutch output side 110 of the lock-up clutch 100 for conjoint rotation.

In this embodiment, the separating clutch 160 is operated in the first through fourth operating states of the torque-transmitting device 20. In the fifth operating state, the first pressure fluid 315 is not pressurized so that the first friction pack 285 is not compressed and thus the first frictional connection in the first friction pack 285 is removed. As a result, in the fifth operating state, a coupling of the rotor 40 to the first inner disc carrier 295 can be removed.

The second output part 245 is mounted on a hub 320. The hub 320 forms the output side 70. The hub 320 engages in the transmission input shaft 55 of the transmission device 30. Radially on the outside, the second output part 245 is coupled to the second energy storage element 240. Here, the second output part 245 can abut a circumferential first end of the second energy storage element 240. The other circumferential end is coupled to the second input part 235 and the motor flange 265. The second input part 235 and the motor flange 265 are each connected to one another at their radially inner end by means of a connection 325, preferably a force-locking connection 325. For example, the connection 325 can be designed to additionally mount the pendulum flange 270 on the motor flange 265.

A third bearing arrangement 340 rotatably supports the shaft 300 in the further housing 260. The third bearing arrangement 340 can be arranged radially on the inside of a housing socket 345 of the further housing 260, which is used to support the guide wheel 190 of the hydrodynamic converter 95. By means of the third bearing arrangement 340, the housing 175 as well as the hydrodynamic converter 95 and the lock-up clutch 100 can be rotatably mounted about the rotation axis 50.

FIG. 9 shows a half-longitudinal section through a structural configuration of the drivetrain 10 shown in FIG. 3.

The torque-transmitting device 20 is designed essentially identically to the torque-transmitting device 20 shown in FIG. 8. In the following, only the differences compared to FIG. 8 will be discussed.

In FIG. 9, the first input side 60 is arranged on the left side of the torque-transmitting device 20 and is designed as a flex plate 344 by way of example. By means of the first input side 60, for example, the crankshaft 35 of the internal combustion engine 15 is bolted to the torque-transmitting device 20.

The torque-transmitting device 20 has the housing 175. The housing 175 defines a housing interior 176. The housing 175 is connected to the first input side 60 on the left side for conjoint rotation. The housing 175 is connected to the pump wheel 115 on the inside and forms the first torque transmission 130 and the second torque transmission 135.

The guide wheel 190 is arranged axially between the pump wheel 115 and the turbine wheel 120, wherein the guide wheel 190 is supported, by way of example, on a housing socket 345 of the housing 175 via a freewheel 350. The housing 175, together with the pump wheel 115, the turbine wheel 120, and the guide wheel 190, defines a converter interior filled with converter fluid. The housing 175 drives the pump wheel 115 in the activated state of the internal combustion engine 15.

In addition to the hydrodynamic converter 95, the separating clutch 160, the second absorber device 225 and the lock-up clutch 100 are also arranged in the housing 175. The torque-transmitting device 20 can be designed, by way of example, in accordance with the design of a two-channel converter or in accordance with the design of a three-channel converter. In FIG. 9, the torque-transmitting device 20 is designed in the manner of a three-channel converter.

The first friction pack 285 has a first friction partner 360 and at least one second friction partner 365.

The first friction partner 360 can be designed, for example, as a lined disc. The second friction partner 365 can be designed as a steel disc, for example. A reverse arrangement would also be conceivable.

The first outer disc carrier 290 and the first inner disc carrier 295 form the second annular gap, wherein the first friction pack 285 is arranged in the second annular gap. Here, the first friction partner 360 is connected to the first inner disc carrier 295, which is arranged radially on the inside of the first outer disc carrier 290, and the second friction partner 365 is connected to the first outer disc carrier 290 in a torque-locking manner, preferably conjoint for rotation, wherein, however, the first friction partner and/or the second friction partner 360, 365 can be displaced in the axial direction with respect to the rotation axis 50.

The first pressure piston 310 is arranged on an axial side of the first friction pack 285 facing away from the turbine wheel 80. Radially on the outside, the first inner disc carrier 295 is connected to a turbine flange 375 for conjoint rotation, for example by means of a first rivet connection 370. The first inner disc carrier 295 forms the second clutch input side 165 as shown in FIG. 3.

The second torsional damper 231 is arranged in the axial direction between the lock-up clutch 100 and the separating clutch 160 in the exemplary embodiment of the torque-transmitting device 20 shown in FIG. 3. Radially on the inside, the second output part 245 is connected to the first inner disc carrier 295, for example. The first inner disc carrier 295 can be formed integrally and in a materially uniform manner with the second output part 245. The first inner disc carrier 295 is rotatably mounted on the hub 320. The hub 320 is connected radially on the outside to the second outer disc carrier 385.

Radially on the outside of the hub 320, the first pressure piston 310 is arranged to be axially displaceable on the hub 320. The hub 320, together with the second output part 245, which is designed to be stepped as an example, and the first outer disc carrier 290, define the first pressure chamber 305. The first pressure chamber 305 is connected to a second pressure channel 380 arranged in the transmission input shaft 55 via a first pressure channel 376 arranged in the hub 320 and running in a radial direction. Via the first and second pressure channels 376, 380 the first pressure fluid 315 from the transmission device 30 can be introduced into the first pressure chamber 305 under pressure. The first pressure fluid 315 can have a liquid, in particular a pressure oil or a hydraulic fluid. At the first pressure piston 310, the pressurized first pressure fluid 315 generates the first actuating force $F_{G1}$ in the first pressure chamber 305. On the rear side, the first friction pack 285 is supported on the first outer disc carrier 290, by way of example. The rear side support (on the side facing the turbine wheel 120) provides a first counterforce $F_{G1}$, wherein the first counterforce $F_{G1}$ acts in opposition to the first actuating force $F_{B1}$, wherein the first counterforce $F_{G1}$ and the first actuating force $F_{B1}$ jointly brace the first friction pack 285, thereby compressing the first friction partner 360 against the second friction partner 365 to form the first frictional connection in the first friction pack 285. As a result, the separating clutch 160 is switched to the second closed state and, by means of the first frictional connection in the first friction pack 285, the first outer disc carrier 290 is connected to the first inner disc carrier 295 in a friction-locking manner, so that the turbine wheel 120 is connected to the second output part 245 and the hub 320 in a torque-locking manner, preferably conjoint for rotation, via the turbine flange 375 and the separating clutch 160.

If the first pressure fluid 315 is not pressurized, the first actuating force $F_{B1}$ is not provided so that the first friction partner 360 and the second friction partner 365 are run free with respect to one another and the separating clutch 160 is open. In this case, as explained above, the turbine wheel 120 is decoupled from the second output part 245 and the hub 320 and thus the output side 70.

In this embodiment, the lock-up clutch 100 is, by way of example, designed as a multiple disc clutch like the separating clutch 160. Naturally, another design of the lock-up clutch 100 and/or the separating clutch 160 would also be conceivable.

The lock-up clutch 100 has a second outer disc carrier 385, a second inner disc carrier 390, a second friction pack 395, and a second pressure piston 400. The second outer disc carrier 385 is axially connected to the housing 175 for conjoint rotation by means of a welding connection 405. The welding connection 405 forms the splitting point 85. The second outer disc carrier 385 forms a third annular gap together with the second inner disc carrier 390, wherein the second friction pack 395 is arranged in the third annular gap. Radially on the inside of the second friction pack 395, the second inner disc carrier 390 is arranged on the hub 320 so as to be rotatable in the circumferential direction. Furthermore, the second inner disc carrier 390 is connected to the second input part 235 of the second torsional damper 231 by means of a second rivet connection 410.

The second friction pack 395 has a third friction partner 415 and a fourth friction partner 420, wherein the third friction partner 415 is designed, for example, as a steel disc and the fourth friction partner 420 is designed, for example, as a lined disc. A reverse arrangement would also be conceivable. The third and fourth friction partners 415, 420 can also be designed as steel discs. The third and fourth friction partners 415, 420 are arranged in an alternating manner in a stack in the second friction pack 395. Here, by way of example, the third friction partner 415 is connected to the second outer disc carrier 385 for conjoint rotation and in an axially displaceable manner, and the fourth friction partner 420 is connected to the second inner disc carrier 390 for conjoint rotation and in an axially displaceable manner. On the left side of the second friction pack 395, the second pressure piston 400 is arranged on a side facing the first input side 60 in FIG. 3, by way of example. The second pressure piston 400 defines a second pressure chamber 425 together with the housing 175 and the second outer disc carrier 385, wherein the second pressure chamber 425 is fluidically connected to the transmission device 30 by means of a third pressure channel 430 partially arranged in the transmission input shaft 55. The second pressure chamber 425 can be filled with a second pressure fluid 435, wherein the filling of the second pressure chamber 425 with the second pressure fluid 435 can be independent of the filling of the first pressure chamber 305 with the first pressure fluid 315. As a result, as already explained in FIGS. 1 and 2, the separating clutch 160 and the lock-up clutch 100 can be switched separately from one another, in particular depending on the operating parameter, between the first open state and the first closed state.

To close the lock-up clutch 100, the transmission device 30 introduces the second pressure fluid 435 under pressure via the third pressure channel 430 into the second pressure chamber 425, wherein in the second pressure chamber 425 the second pressure fluid 435 acts on the second pressure piston 400 and provides a second actuating force $F_{B2}$. The second pressure fluid 435 can be a pressure oil or a hydraulic fluid. The second pressure fluid 435 can be identical to the first pressure fluid 315.

On the side facing the second torsional damper 231, the second friction pack 395 is axially supported on the second outer disc carrier 385, as a result of which a second counterforce $F_{G2}$ acts on the second friction pack 395 when the second actuating force $F_{B2}$ is provided. As a result of the second actuating force $F_{B2}$ and the second counterforce $F_{G2}$, the third and fourth friction partners 415, 420 are pressed against one another and form a second frictional connection with which the second friction pack 395 connects the second outer disc carrier 385 in a torque-locking manner, preferably for conjoint rotation, and in a friction-locking manner to the second inner disc carrier 390 in the second closed state.

Regarding the embodiment shown in FIG. 9, it is advantageous if the rotor 40 is arranged on the outside of the transmission input shaft 55. This means that the drivetrain 10 can be designed to be particularly compact. Furthermore, unfavorable operating states can be avoided. The transmission input shaft 55 forms the second input side 65, the second torque transmission 250, and the tenth torque transmission 176, as well as the output side 70.

In the first drive operating state, the torque transmission of the first torque M1 occurs within the torque-transmitting device 20 shown in FIG. 3 according to the continuous arrows shown in FIG. 3.

Here, the first torque M1 is guided radially on the inside from the first input side 60 and introduced into the housing 175 from the first input side 60. The first torque M1 is transmitted from the first input side 60 to the pump wheel 115 via the housing 175 in the first drive operating state. The pump wheel 115 circulates the converter fluid between the pump wheel 115, turbine wheel 120, and guide wheel 190. By means of the converter fluid, the first torque M1 is further transmitted to the turbine wheel 120 with the torque increase. The first increased torque M1U is guided via the turbine flange 375 to the first rivet connection 370. The first rivet connection 370 transmits the increased first torque M1U to the first inner disc carrier 295, which is rotatably mounted on the hub 320. In the first drive operating state, the first pressure fluid 315 is provided under pressure so that, as explained above, the separating clutch 160 is closed. Due to the first frictional connection present in the first friction pack 285, the first increased torque M1U is transmitted to the first outer disc carrier 290, which introduces the first increased torque M1U into the second output part 245 via the welding connection 405. The second output part 245 guides the increased first torque M1U radially to the inside and transmits the increased first torque M1U into the hub 320 via the welding connection 405. At the hub 320, the first increased torque M1U is introduced from the hub 320 into the transmission input shaft 55.

In the second drive operating state, the first pressure fluid 315 is provided unpressurized so that the separating clutch 160 is open and the first friction partner 360 runs free relative to the second friction partner 365. As a result, the turbine wheel 120 is decoupled from the second outer disc carrier 385 and the mass rotating with the second output part 245 is reduced compared to the second closed state of the separating clutch 160.

In the third and fourth drive operating states of the drivetrain 10 shown in FIG. 2, the electric machine 25 is activated and the rotor 40 acts directly on the transmission input shaft 55.

FIG. 10 shows a functional diagram of a drivetrain 10 according to an eighth embodiment.

The drivetrain 10 is designed essentially identically to the drivetrain 10 explained in FIG. 1. In the following, only the differences between the drivetrain 10 shown in FIG. 10 and the drivetrain 10 shown in FIG. 1 will be discussed.

The separating clutch 160 is arranged between the merging point 90 and the turbine wheel 120. The second clutch input side 165 is connected to the turbine wheel 120 for conjoint rotation and the second clutch output side 170 is connected to the merging point 90 for conjoint rotation. Thus, in the second open state, the separating clutch 160 interrupts the third torque transmission 140 between the turbine wheel 120 and the merging point 90. In the second closed state, the second clutch input side 165 is connected to the merging point 90 in a torque-locking manner, preferably for conjoint rotation.

For example, the separating clutch 160 can be arranged within the housing 175 so that both the separating clutch 160 and the lock-up clutch 100 can be designed as wet-running clutches. This ensures particularly good cooling of both the lock-up clutch 100 and the separating clutch 160.

LIST OF REFERENCE NUMERALS

10 Drivetrain
15 Internal combustion engine
20 Torque-transmitting device
25 Electric machine
30 Transmission device
35 Crankshaft
40 Rotor
45 Stator
50 Rotation axis
55 Transmission input shaft
60 First input side
65 Second input side
70 Output side
75 First torque-transmitting path
80 Second torque-transmitting path
85 Splitting point
90 Merging point
95 Hydrodynamic converter
100 Lock-up clutch
105 First clutch input side
110 First clutch output side
115 Pump wheel
120 Turbine wheel
130 First torque transmission
135 Second torque transmission
140 Third torque transmission
145 Fourth torque transmission
150 Fifth torque transmission
155 Sixth torque transmission
160 Separating clutch
165 Second clutch input side
170 Second clutch output side
175 Housing
176 Housing interior
180 Seventh torque transmission 185 Eighth torque transmission
190 Guide wheel
195 First absorber device
200 First torsional damper
205 First input part
210 First output part
215 First energy storage element
220 Ninth torque transmission
225 Second absorber device
230 Centrifugal pendulum
231 Second torsional damper
235 Second input part
240 Second energy storage element
245 Second output part
250 Tenth torque transmission
255 Pendulum mass
260 Further housing
265 Motor flange
270 Pendulum flange
275 First annular gap
280 First bearing arrangement
285 First friction pack
290 First outer disc carrier
295 First inner disc carrier
300 Shaft
305 First pressure chamber
310 First pressure piston
315 First pressure fluid
320 Hub
325 Connection
330 Second bearing arrangement
335 Connecting hub
340 Third bearing arrangement
344 Flex plate
345 Housing socket
350 Freewheel
360 First friction partner
365 Second friction partner
370 First rivet connection
375 Turbine flange
376 First pressure channel
380 Second pressure channel
385 Second outer disc carrier
390 Second inner disc carrier
395 Second friction pack
400 Second pressure piston
405 Welding connection
410 Second rivet connection
415 Third friction partner
420 Fourth friction partner
425 Second pressure chamber
430 Third pressure channel
435 Second pressure fluid
$F_{B1}$ First actuating force
$F_{G1}$ First counterforce
$F_{B2}$ Second actuating force
$F_{G2}$ Second counterforce
M1 First torque
M1U Increased first torque
M2 Second torque
n1 First speed
n2 Second speed

The invention claimed is:

1. A torque-transmitting device, comprising:
a first input side, a second input side, an output side, a hydrodynamic converter, a lock-up clutch, a first torque-transmitting path which runs between a splitting point and a merging point, and a second torque-transmitting path which is configured so as to be parallel with respect to the first torque-transmitting path;
wherein the hydrodynamic converter is arranged in the first torque-transmitting path and the lock-up clutch is arranged in the second torque-transmitting path;
wherein the hydrodynamic converter has a pump wheel and a turbine wheel which is hydrodynamically connectable to the pump wheel;
wherein the splitting point is connected to the first input side for conjoint rotation;
wherein the pump wheel and a first clutch input side of the lock-up clutch are each connected to the splitting point for conjoint rotation;
wherein a second input side is connected downstream of the merging point in a torque flow of a first torque from the first input side to the output side.

2. The torque-transmitting device according to claim 1, wherein the first input side is designed to be rigid.

3. The torque-transmitting device according to claim 1, further comprising:
a separating clutch,
wherein the separating clutch is arranged between the second input side and the turbine wheel of the hydrodynamic converter and is designed to connect the turbine wheel to the second input side in a torque-locking manner in a closed state and to decouple the second input side from the turbine wheel in a first open state.

4. The torque-transmitting device according to claim 3, wherein the separating clutch is arranged between the second input side and the merging point.

5. The torque-transmitting device according to claim 3, further comprising:
a flex plate and a housing defining a housing interior;
wherein the first torque-transmitting path and the second torque-transmitting path are formed in the housing interior at least in sections;
wherein the flex plate is connected to the housing for conjoint rotation and forms the first input side;
wherein the housing rigidly connects the pump wheel to the flex plate for conjoint rotation;
wherein the separating clutch is positioned one of in the housing interior or outside the housing;
wherein the second input side is arranged outside the housing.

6. The torque-transmitting device according to claim 5, further comprising a further housing;
wherein the further housing is stationary, and the housing is rotatably mounted about a rotation axis;
wherein the second input side is arranged inside the further housing.

7. The torque-transmitting device according to claim 3, wherein the separating clutch is arranged between the turbine wheel and the merging point.

8. The torque-transmitting device according to claim 1, further comprising:
a first absorber device,
wherein the first absorber device is arranged between the lock-up clutch and the second input side and is designed to at least partially cancel out a rotational irregularity of the first torque;
wherein the first absorber device has at least one first torsional damper, the first torsional damper being at least one of a dual mass flywheel, a series damper, simple torsional damper, a centrifugal pendulum.

9. The torque-transmitting device according to claim 8, further comprising a separating clutch arranged between the second input side and the turbine wheel of the hydrodynamic converter;
- wherein the first absorber device is arranged between the lock-up clutch and one of the merging point or the separating clutch.

10. The torque-transmitting device according to claim 8, further comprising a second absorber device;
- wherein the second absorber device is arranged between the second input side and the output side and is designed to at least partially cancel out a rotational irregularity of the first torque;
- wherein the second absorber device has at least one second torsional damper, the second torsional damper including at least one of a dual mass flywheel, a series damper, simple torsional damper, or a centrifugal pendulum.

11. The torque-transmitting device according to claim 1, further comprising:
- a second absorber device;
- wherein the second absorber device is arranged between the second input side and the output side and is designed to at least partially cancel out a rotational irregularity of the first torque;
- wherein the second absorber device has at least one second torsional damper, the second torsional damper including at least one of a dual mass flywheel, a series damper, simple torsional damper, a centrifugal pendulum.

12. The torque-transmitting device according to claim 11, wherein the second torsional damper has a second input part, a second output part, and at least one second energy storage element;
- wherein the second input part is rotatable relative to the second output part against the action of the second energy storage element;
- wherein the second input part is connected to the second input side for conjoint rotation, and the second output part is connected to the output side for conjoint rotation;
- wherein the centrifugal pendulum is arranged at one of the second output part or the second input part.

13. The torque-transmitting device according to claim 1, wherein the first input side is connectable to a crankshaft of an internal combustion engine for conjoint rotation, and the internal combustion engine is designed to provide a first torque at the first input side;
- wherein the second input side is connectable to an electric machine in a torque locking manner.

14. The torque-transmitting device according to claim 1, wherein the outputs side is connectable to a transmission device.

15. A drivetrain for a motor vehicle, comprising:
an internal combustion engine including a crankshaft; and
a torque transmitting device including a first input side, a second input side, an output side, a hydrodynamic converter, a lock-up clutch, a first torque-transmitting path which runs between a splitting point and a merging point, and a second torque-transmitting path which is configured so as to be parallel with respect to the first torque-transmitting path;
- wherein the hydrodynamic converter is arranged in the first torque-transmitting path and the lock-up clutch is arranged in the second torque-transmitting path;
- wherein the first input side is connected to the crankshaft for conjoint rotation, and the internal combustion engine is designed to provide a first torque at the first input side;
- wherein the hydrodynamic converter has a pump wheel and a turbine wheel which is hydrodynamically connectable to the pump wheel;
- wherein the splitting point is connected to the first input side for conjoint rotation;
- wherein the pump wheel and a first clutch input side of the lock-up clutch are each connected to the splitting point for conjoint rotation;
- wherein a second input side is connected downstream of the merging point in a torque flow of a first torque from the first input side to the output side.

16. The drivetrain according to claim 15, further comprising an electric machine, wherein the second input side is connectable to the electric machine in a torque-locking manner, and the electric machine is designed to provide a second torque at the second input side.

17. The drivetrain according to claim 16, wherein the second input side is designed to superimpose the first torque with the second torque.

18. The drivetrain according to claim 16, further comprising a separating clutch, wherein the separating clutch is arranged between the second input side and the turbine wheel of the hydrodynamic converter and is designed to connect the turbine wheel to the second input side in a torque-locking manner in a closed state and to decouple the second input side from the turbine wheel in a first open state.

19. The drivetrain according to claim 18, wherein in one operating state, the electric machine is designed to drive the second input side at a second speed, the first input side rotates at a first speed or stands still, the separating clutch is switched to the open state, and the second input side is decoupled from the turbine wheel.

20. The drivetrain according to claim 15, further comprising a transmission device, wherein the output side is connected to the transmission device.

* * * * *